(12) United States Patent
Kubo

(10) Patent No.: US 7,333,144 B2
(45) Date of Patent: Feb. 19, 2008

(54) ELECTRONIC FLASH DEVICE AND CAMERA HAVING THE SAME

(75) Inventor: Naoki Kubo, Saitama-ken (JP)

(73) Assignee: Fujifilm Corporation, Tokyo (JP)

( * ) Notice: Subject to any disclaimer, the term of this patent is extended or adjusted under 35 U.S.C. 154(b) by 696 days.

(21) Appl. No.: 10/631,765

(22) Filed: Aug. 1, 2003

(65) Prior Publication Data

US 2004/0033071 A1     Feb. 19, 2004

(30) Foreign Application Priority Data

Aug. 2, 2002   (JP)   ............................. 2002-225969

(51) Int. Cl.
*H04N 5/222* (2006.01)
*H04N 5/335* (2006.01)

(52) U.S. Cl. ...................... 348/371; 348/314

(58) Field of Classification Search ................ 348/396, 348/370–371, 296, 311, 312, 314; 396/157, 396/158
See application file for complete search history.

(56) References Cited

U.S. PATENT DOCUMENTS

| 4,837,628 A * | 6/1989 | Sasaki .................... 348/220.1 |
| 6,778,214 B1* | 8/2004 | Toma ......................... 348/314 |
| 2002/0191102 A1* | 12/2002 | Yuyama et al. ............. 348/370 |
| 2003/0086005 A1* | 5/2003 | Nakamura ................ 348/223.1 |
| 2004/0056975 A1* | 3/2004 | Hata .......................... 348/371 |
| 2004/0095504 A1* | 5/2004 | Yasuda ....................... 348/345 |

FOREIGN PATENT DOCUMENTS

| JP | 06-214292 A | 8/1994 |
| JP | 07-131797 A | 5/1995 |
| JP | 11-212150 A | 8/1999 |
| JP | 2000-295522 A | 10/2000 |
| JP | 2001-174884 A | 6/2001 |

* cited by examiner

*Primary Examiner*—Tuan Ho
*Assistant Examiner*—Timothy J Henn
(74) *Attorney, Agent, or Firm*—Birch, Stewart, Kolasch & Birch, LLP

(57) ABSTRACT

An electronic flash device and a camera which can smoothly display a video even though preliminary emission for red-eye reduction in photographing the video are obtained. A timing generator generates a preliminary emission signal such that preliminary emission for red-eye reduction by a light emitting tube is performed in a period of operation of an electronic shutter arranged in an interline CCD to input the preliminary emission signal to a trigger circuit. The timing generator sets a period in which the preliminary emission signal is set at an active level as a period corresponding to a cycle between the edge of a pulse of a transfer gate signal serving as for transferring signal charges from a light-receiving element of the CCD to a vertical transfer path and the edge of a pulse of an overflow drain signal representing a timing at which excess charges are drained by an overflow drain of the CCD.

9 Claims, 6 Drawing Sheets

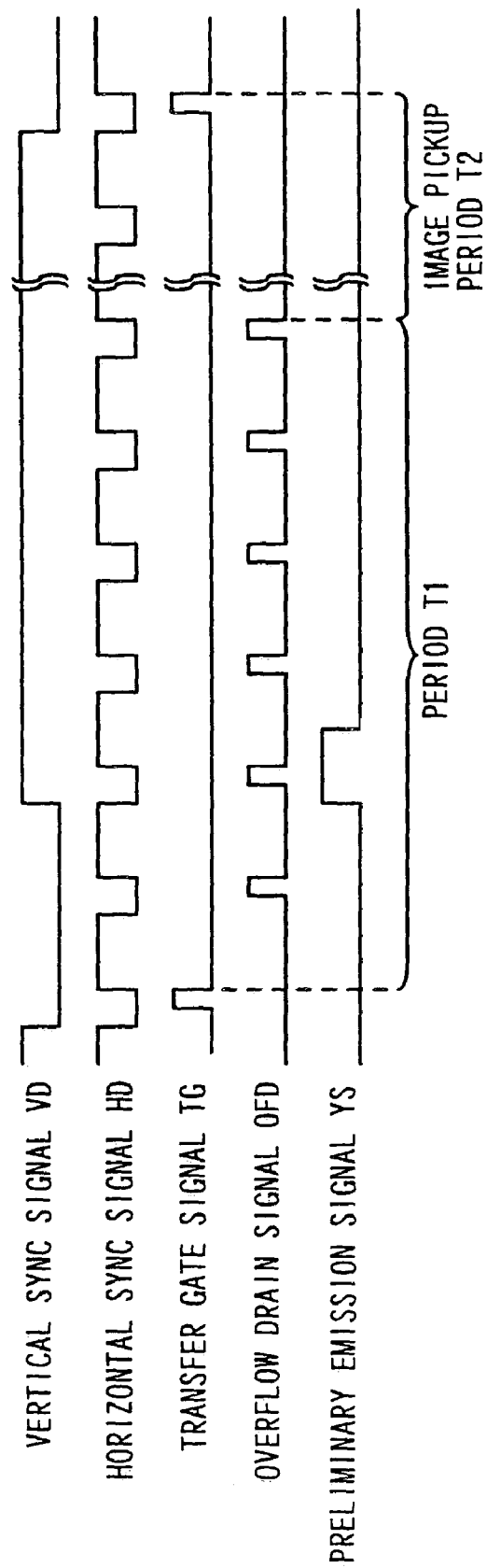

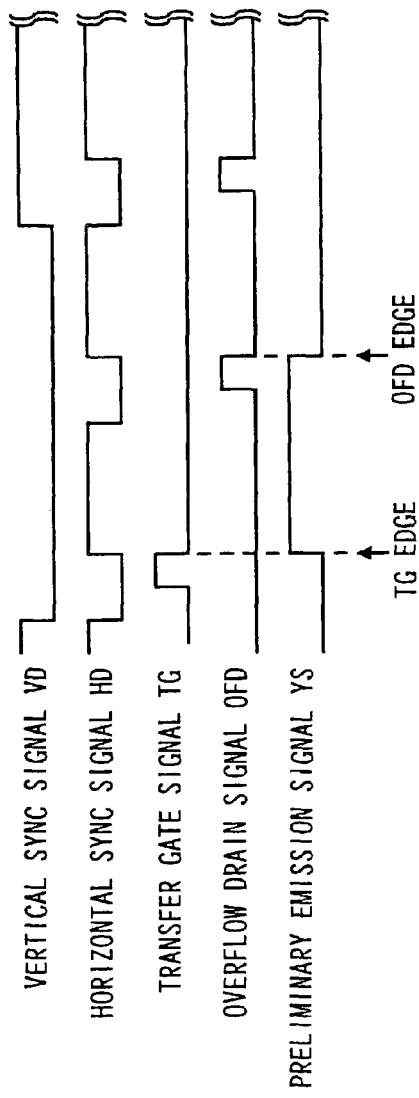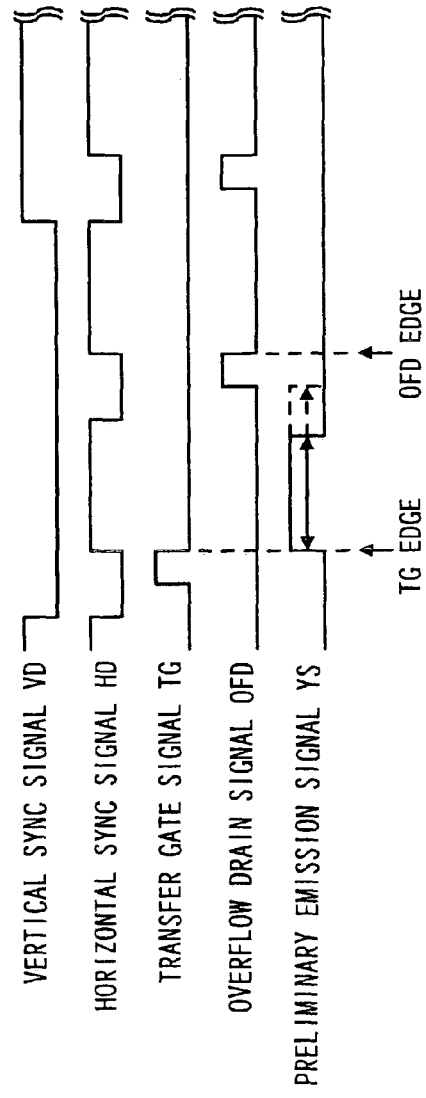

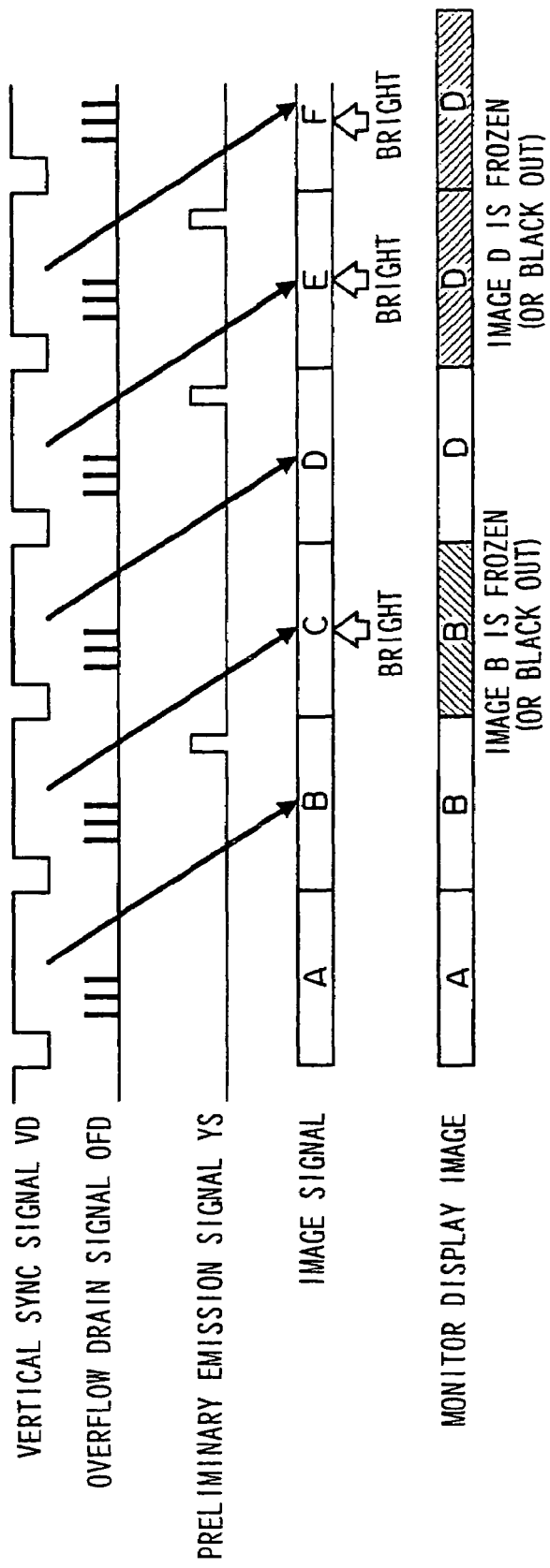

ELECTRONIC FLASH DEVICE AND CAMERA HAVING THE SAME

CROSS-REFERENCE TO RELATED APPLICATION

This application claims priority under 35 USC 119 from Japanese Patent Application No. 2002-225969, the disclosure of which is incorporated by reference herein.

BACKGROUND OF THE INVENTION

1. Field of the Invention

The present invention relates to an electronic flash device and a camera and, more particularly, to an electronic flash device which can perform previous light emission for red-eye reduction and a camera.

2. Description of the Related Art

In recent years, with an increase in resolution of an image pickup device such as a CCD (Charge Coupled Device) or a CMOS (Complementary Metal Oxide Semiconductor) image sensor, the demand for digital camera has been rapidly increasing. As digital cameras of this type, a large number of products which can photograph not only still images but also videos are commercialized.

In a digital camera of this type, in general, when an object to be photographed is dark, the object is photographed such that flash light is irradiated on the object. At this time, light reflected from the retina of a pupil is reddish. As a result, a so-called red-eye phenomenon in which the pupils of a person are photographed as red pupils may occur. Conventionally, various technologies for reducing red-eye phenomena have been disclosed. As a typical technology for reducing a red-eye phenomenon, a technology (for example, technology described in Japanese Patent Application Laid-Open (JP-A) No. 2001-174884) in which a flash is preliminarily fired (so-called pre-emission) to constrict pupils and mainly fired for photographing after the pupils are constricted is widely known.

FIG. 5 shows an electric configuration of a conventional digital camera which performs the preliminary emission. The digital camera shown in FIG. 5 includes: an image pickup system constituted by a CCD for picking an object image, an analog signal processing unit for performing various pieces of analog signal processing to analog image information obtained by the CCD, an ADC (analog/digital converter) for converting the analog image information into digital image information, and a digital signal processing unit for performing various pieces of digital signal processing to the digital image information, a CPU (Central Processing Unit) for controlling the entire operation of digital camera 10, and an electronic flash device for irradiating auxiliary light to an object if necessary in a photographing operation.

Although not shown, a digital camera of this type generally includes a display system for displaying a picked image, a recording medium for recording image information obtained by image pickup, and the like.

In general, such a digital camera, as shown in FIG. 5, comprises a timing generator for generating a timing signal for driving a CCD, an analog signal processing unit, an ADC, and the like under the control of a CPU to supply the timing signal to the respective components. A main emission signal for causing a light-emitting tube included in an electronic flash to perform main emission is generated by the timing generator. However, a preliminary emission signal for causing the light-emitting tube to preliminarily emit light is generated by a process performed by software in the CPU.

In the above conventional technology for performing preliminary emission, preliminary emission is generally performed regardless of an operation timing of a CCD. For this reason, when preliminary emission is performed in photographing of a video and in a period of exposure performed by the CCD, only a frame corresponding to the exposure period is brighter than other frames. As a result, a display screen of the video disadvantageously flickers.

When a CCD is used as an image pickup device, as an example, as shown in FIG. 6, image signals of frames are sequentially output from the CCD at timings synchronous with a vertical synchronous signal VD. In this case, a period except for a period in which an overflow drain signal OFD representing a timing at which excess charges are drained by an overflow drain arranged in the CCD is input to the CCD is almost equal to an exposure period of the CCD. However, a preliminary emission signal YS representing a timing of preliminary emission in the period is output toward a light-emitting tube, an image signal obtained by an image pickup operation performed in this period has a luminance which is considerably higher than that of an image signal obtained in another period. Therefore, when a video is displayed by using the image signal obtained as described above, the display image flickers.

Therefore, as conventional technologies, the following technologies are known. That is, as shown in FIG. 6, the display of an immediately previous frame is frozen as the display of a frame corresponding to a period of preliminary emission, or the display of the corresponding frame is blacked out (inky black).

However, by the technology for freezing a display screen or the technology for blacking out a display screen, an actual image of a frame corresponding to a period of preliminary emission is not displayed. For this reason, a video is not smoothly displayed.

As is described with reference to FIG. 5, in a conventional digital camera which can perform preliminary emission, the preliminary emission signal is generally generated by a process performed by software in a CPU. For this reason, a load of processing on the CPU disadvantageously increases in comparison with a case in which preliminary emission is not performed.

SUMMARY OF THE INVENTION

The present invention has been made to solve the above problems, and has as its first object to provide an electronic flash device which can cause a camera to smoothly display a video even though preliminary emission for red-eye reduction in photographing of the video. It is the second object of the invention to provide a camera which can smoothly display a video even though preliminary emission for red-eye reduction in photographing of a video while suppressing a load of processing from being increased.

In order to achieve the first object, according to a first aspect of the invention, there is provided an electronic flash device which is used in a camera for performing photographing by an image pickup operation performed by a charge coupled device having an electronic shutter and which irradiates auxiliary light on an object if necessary in photographing by the camera, including a light-emitting unit for emitting light to be irradiated on an object, and an emission control unit for controlling the light-emitting unit such that preliminary emission for red-eye reduction for constricting pupils of a person is performed in a period of operation of the electronic shutter.

According to the electronic flash device of the first aspect of the invention, the light irradiated on the object is emitted from the light-emitting unit. The light-emitting unit includes all light-emitting tubes such as a xenon lamp and a metal halide lamp.

In the invention, the emission control unit controls the light-emitting unit such that preliminary emission for red-eye reduction for constricting the pupils of a person is performed in a period of operation of the electronic shutter arranged in the charge coupled device for image pickup. The charge coupled device includes an interline charge coupled device and a frame transfer charge coupled device.

More specifically, according to the invention, it is noticed that a period in which the electronic shutter arranged in the charge coupled device is operated corresponds to a period in which an image pickup operation is not performed by the charge coupled device, and a period for executing preliminary emission is limited to only a period of operation of the electronic shutter. For this reason, the image pickup operation is prevented from being adversely affected by preliminary emission, and a video can be smoothly displayed even though preliminary emission is performed in photographing of the video.

As described above, according to the electronic flash device of the first aspect of the invention, since preliminary emission for red-eye reduction is performed in a period of operation of the electronic shutter arranged in the charge coupled device, a video can be smoothly displayed even though preliminary emission for red-eye reduction is performed in photographing of the video.

An electronic flash device according to a second aspect of the invention is designed such that, in the first aspect of the invention, the emission control unit controls the light-emitting unit in synchronization with a charge transfer signal used for driving the charge coupled device. In this case, the charge transfer signal includes a transfer gate signal serving as a signal for transferring signal charges from a light-receiving element to a vertical transfer path (register) when an interline CCD is applied as the charge coupled device according to the invention and an overflow drain signal representing a timing at which excess charges are drained by an overflow drain.

More specifically, preliminary emission is controlled by using a charge transfer signal used for driving the charge coupled device for image pickup. For this reason, control for preliminary emission can be easily performed.

As described above, according to the electronic flash device of the second aspect of the invention, the same effect as that of the first aspect of the invention can be achieved, and the light-emitting unit is controlled in synchronization with a charge transfer signal used for driving the charge coupled device. For this reason, the control can be easily performed.

On the other hand, in order to achieve the second object, according to a third aspect of the invention, there is provided a camera includes: an electronic flash device according to the second aspect of the invention, a charge coupled device for image pickup having an electronic shutter, and a signal generating unit for generating a drive signal for driving at least the charge coupled device, wherein the emission control unit of the electronic flash device is included in the signal generating unit.

The camera according to the third aspect of the invention includes: the electronic flash device according to the second aspect of the invention, a charge coupled device for image pickup having an electronic shutter, and a signal generating unit for generating a drive signal for driving at least the charge coupled device. In this case, the signal generating unit corresponds to the timing generator described above. The charge coupled device includes an interline charge coupled device and a frame transfer charge coupled device. The drive signal includes the charge transfer signal described above.

More specifically, when the electronic flash device according to the second aspect is arranged, the following effect can be obtained. That is, a video can be smoothly displayed even though preliminary emission for red-eye reduction is performed in photographing of the video.

On the other hand, in the invention, the emission control unit arranged in the electronic flash device is included in the signal generating unit.

More specifically, according to the invention, by using the signal generating unit which can generate a drive signal for the charge coupled device including the charge transfer signal, the emission control unit which controls the light-emitting unit in synchronization with the charge transfer signal is realized, so that the light-emitting unit can be easily controlled. The signal generating unit corresponding to the timing generator is generally constituted as a component independently of the CPU, the signal generating unit controls the light-emitting unit to perform preliminary emission, so that a load of processing on the CPU is suppressed from being increased in comparison with a case in which a preliminary emission signal is generated by a CPU.

As described above, according to the third aspect of the invention, there is provided a camera including the electronic flash device according to the second aspect of the invention, a charge coupled device for image pickup having an electronic shutter, and a signal generating unit for generating a drive signal for driving at least the charge coupled device, wherein the emission control unit of the electronic flash device is included in the signal generating unit. For this reason, even though preliminary emission for red-eye reduction in photographing of a video while suppressing a load of processing from being increased, the video can be smoothly displayed.

BRIEF DESCRIPTION OF THE DRAWINGS

FIG. 3 is a timing chart showing the states of various signals generated by a timing generator 52 when preliminary emission is performed when a power switch 94 of the digital camera 10 according to the embodiment is set in an ON state.

FIGS. 4A and 4B are timing charts applied to an explanation of another embodiment.

FIG. 6 is a time chart applied to an explanation of problems of a prior art.

DETAILED DESCRIPTION OF THE INVENTION

An embodiment of the present invention will be described below with reference to the accompanying drawings. An embodiment in a case in which an electronic flash device and a camera according to the invention are applied to a digital electronic still camera (to be referred to as a "digital camera" hereinafter) will be described below.

The external configuration of the digital camera 10 according to this embodiment will be described below with reference to FIG. 1.

Figure 1:
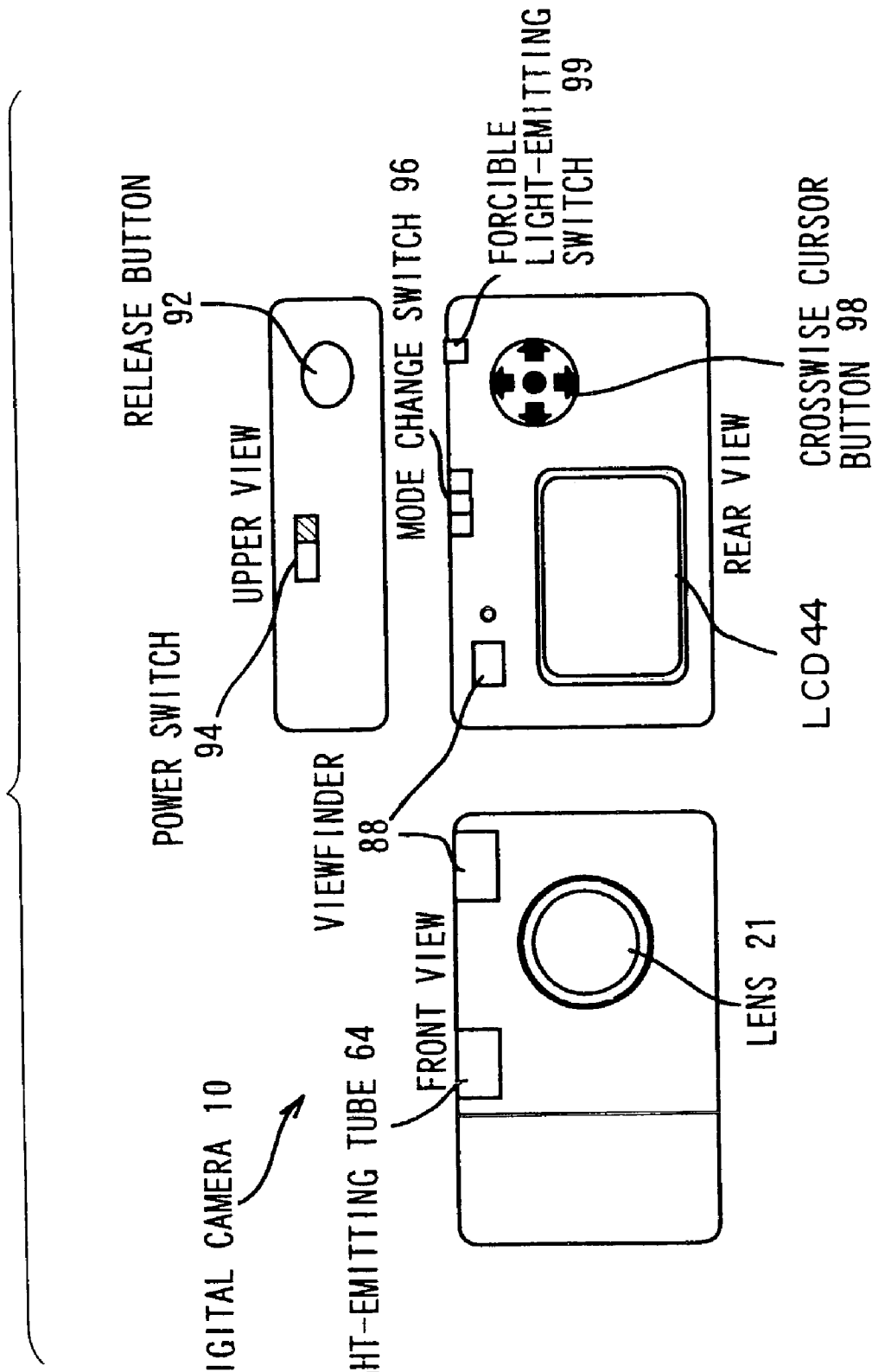
FIG. 1 is an outline view showing the outline of a digital camera 10 according to an embodiment of the present invention.

As shown in FIG. 1, in front of the digital camera 10, a lens 21 for forming an object image, a light-emitting tube 64 for emitting light to be irradiated on an object if necessary in photographing, and a viewfinder 88 used to determine a picture composition of the object to be photographed are arranged. On the upper surface of the digital camera 10, a release button (so-called shutter) 92 which is depressed by the user when photographing is executed and a power switch 94 are arranged.

The release button 92 according to the embodiment is designed such that depressing operations of two states, i.e., a state (to be referred to as a half depression state hereinafter) in which the release button 92 is depressed to an intermediate position and a state (to be referred to as a "full depression state" hereinafter) in which the release button 92 is depressed to the final depression position being deeper than the intermediate position can be detected. In the digital camera 10 according to the embodiment, after the release button 92 is half depressed to operate an AE (Automatic Exposure) function to set an exposure state (shutter speed and the state of the aperture), an AF function is operated to control a focusing operation. Thereafter, the release button 92 is set in the full depression state, exposure (photographing) is performed.

On the other hand, on the back of the digital camera 10, the eyepiece unit of the viewfinder 88, a liquid crystal display (to be referred to as an "LCD" hereinafter) 44 for displaying an object image or various menu screens displayed by digital image data obtained by photographing, a message, and the like, a mode change switch 96 which is operated to set any one of a photographing mode serving as a mode for performing photographing and a, reproduction mode serving as a mode for displaying (reproducing) an object image shown by digital image data obtained by photographing on the LCD 44, a crosswise cursor button 98 which is designed to include a total of five keys constituted by four arrow keys indicating moving directions of up, down, left, and right in the display area of the LCD 44 and a determination key positioned at a center of the four arrow keys, and a forcible light-emitting switch 99 which is operated when a forcible light-emitting mode serving as a mode for forcible causing the light-emitting tube 64 to emit light in subsequent photographing.

The configuration of the electric system of the digital camera 10 according to the embodiment will be described below with reference to FIG. 2.

Figure 2:
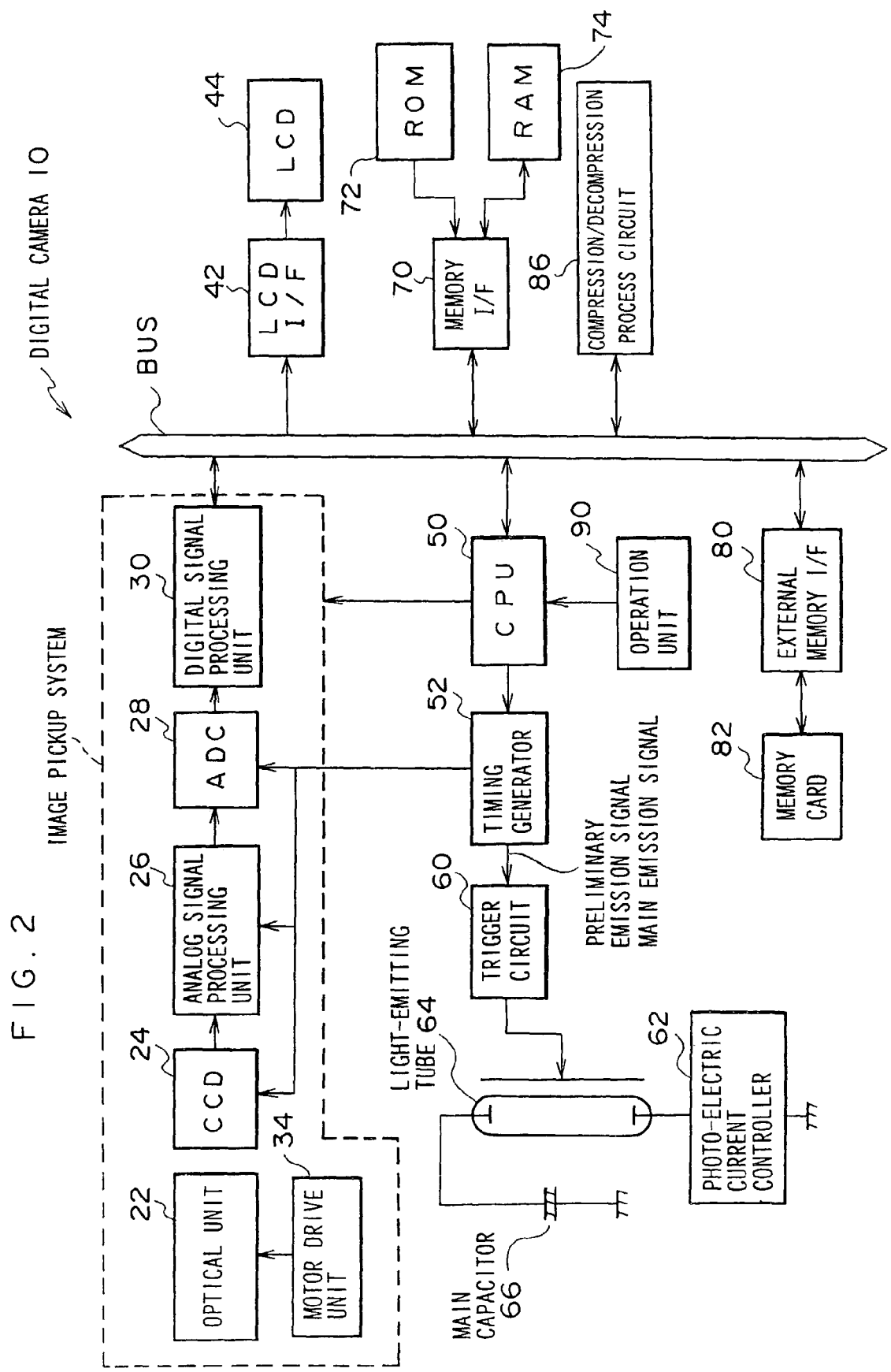
FIG. 2 is a block diagram showing the configuration of the electric system of the digital camera 10 according to the embodiment of the invention.
Figure 5:
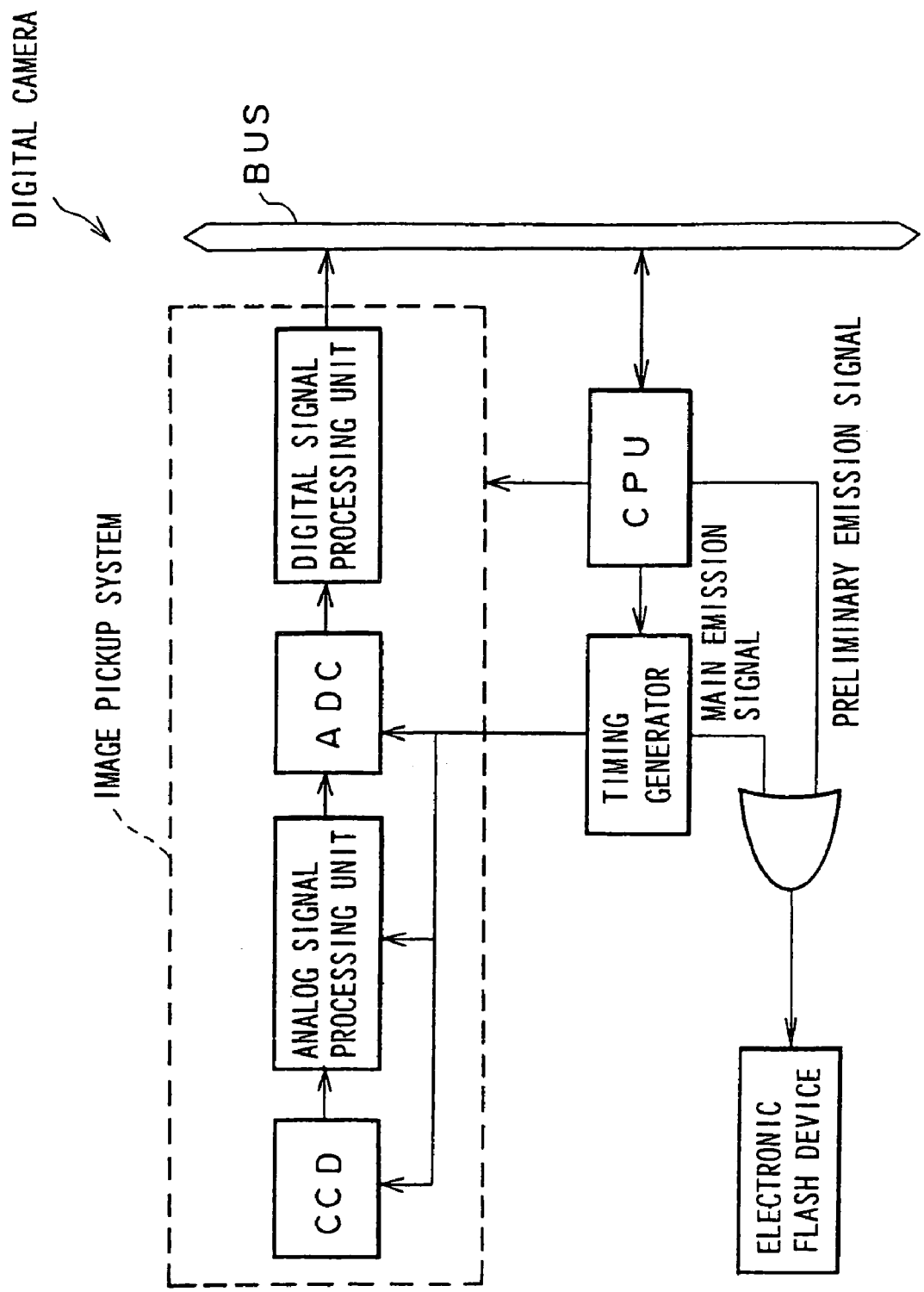
FIG. 5 is a block diagram showing a configuration of an electric system of a conventional digital camera.

As shown in FIG. 2, the digital camera 10 includes an optical unit 22 including the lens 21, an interline charge coupled device 24 arranged behind the lens 21 along the optical axis, an analog signal processing unit 26 including a correlated double sampling circuit (to be referred to as a "CDS" hereinafter), an analog/digital converter (to be referred to as an "ADC" hereinafter) 28 for converting an input analog signal into digital data, and a digital signal processing unit 30, having a line buffer having a predetermined capacity, for performing control for directly storing the input digital image data in a predetermined area of a RAM 74 (will be described later) and for performing various pieces of image processing to the digital image data. The output terminal of the CCD 24 is connected to the input terminal of the analog signal processing unit 26, the output terminal of the analog signal processing unit 26 is connected to the input terminal of the analog/digital converter 28, and the output terminal of the ADC 28 is connected to the input terminal of the digital signal processing unit 30.

A correlated double sampling process performed by the CDS obtains accurate pixel data by calculating a difference between a field through component level and a pixel signal component level included in an output signal of each pixel of a solid-state image pickup device to reduce noise or the like (especially, thermal noise) included in an output signal of the solid-state image pickup device.

On the other hand, the digital camera 10 includes an LCD interface 42 for generating a signal for displaying an image, a menu screen, or the like shown by digital image data on the LCD 44 to supply the signal to the LCD 44, a CPU 50 for controlling the entire operation of the digital camera 10, a ROM (Read Only Memory) 72 in which various programs, various tables, various parameters, and the like are stored in advance, a RAM (Random Access Memory) 74 for storing digital image data mainly obtained by photographing, a memory interface 70 for performing control of an access to the ROM 72 and the RAM 74, an external memory interface 80 for making it possible to cause the digital camera 10 to access a memory card 82 constituted by a Smart Media (R), and a compression/expansion process circuit 86 for performing a compression process to digital image data by a predetermined compression format and for performing an expansion process to the digital image data subjected to the compression process depending on the compression format.

The digital signal processing unit 30, the LCD interface 42, the CPU 50, the memory interface 70, the external memory interface 80, and the compression/expansion process circuit 86 are connected to each other through a system BUS. Therefore, the CPU 50 can control the operations of the digital signal processing unit 30 and the compression/expansion process circuit 86, can display various pieces of information on the LCD 44 through the LCD interface 42, and can access the ROM 72, the RAM 74, and the memory card 82 through the memory interface 70 and the external memory interface 80.

The digital camera 10 comprises a motor drive unit 34. The drives of a focus adjustment motor, a zoom motor, and an aperture drive motor (all the motors are not shown) which are arranged in the optical unit 22 are controlled by the CPU 50 through the motor drive unit 34.

More specifically, the lens 21 included in the optical unit 22 according to the embodiment has a plurality of lenses, is constituted as a zoom lens which can change the focal length (variable power), and comprises, a lens drive mechanism (not shown). The lens drive mechanism includes the focus adjustment motor, the zoom motor, and the aperture drive motor. The focus adjustment motor, the zoom motor, and the drive motor are driven by drive signals supplied from the motor drive unit 34 under the control of the CPU 50.

The CPU 50 drives and controls the zoom motor when an optical zoom magnification is changed, and changes the focal length of the lens 21 included in the optical unit 22.

The CPU 50 drives and controls the focus adjustment motor such that a contrast of an image obtained by photographing performed by the CCD 24, thereby controlling a focusing operation. More specifically, in the digital camera 10 according to the embodiment, as a scheme for controlling a focusing operation, a so-called TTL (Through The Lens) scheme which sets a lens position to maximize a contrast of a read image is employed.

In addition, the CPU 50 always calculates AE information representing the brightness of an image obtained by photographing performed by the CCD 24 on the basis of a luminance signal Y (to be described later) obtained by performing YC signal processing to digital image data obtained by the photographing. When the release button 92 is half depressed, the CPU 50 derives an optimum shutter speed and an optimum numerical aperture depending on the brightness of the image shown by the AE information, the CPU 50 controls related components to set the derived shutter speed and drives and controls the aperture drive motor to set the derived numerical aperture, thereby setting an exposure state.

In addition, the various buttons and switches (generically called an "operation unit 90" in FIG. 2) such as the release button 92, the power switch 94, the mode change switch 96, the crosswise cursor button 98, and the forcible light-emitting switch 99 are connected to the CPU 50. The CPU 50 can always comprehend an operation state for the operation unit 90.

On the other hand, in the digital camera 10 mainly comprises a timing generator 52 which generates timing signals (including a vertical sync signal VD, a horizontal sync signal HD, a transfer gate signal TG, an overflow drain signal OFD, and a preliminary emission signal YS (to be described later)) for driving the CCD 24, the analog signal processing unit 26, and the ADC 28 and supplies the timing signals to the respective components. The CCD 24, the analog signal processing unit 26, the ADC 28, and the like are controlled by the CPU 50 through the timing generator 52.

The digital camera 10 comprises a trigger circuit 60 which is interposed between the light-emitting tube 64 and the timing generator 52 and which controls the emission of the light-emitting tube 64 depending on a main emission signal and a preliminary emission signal YS (to be described later) generated by the timing generator 52, a main capacitor 66 in which charges of the light-emitting tube 64 are accumulated, and a photo-electric current controller 62 for controlling a photo-electric current supplied from the main capacitor 66 to the light-emitting tube 64 under the control of the CPU 50.

The CCD 24 corresponds to the charge coupled device according to the invention, the light-emitting tube 64 corresponds to the light-emitting unit according to the invention, the timing generator 52 corresponds to an emission control unit and a signal generating unit according to the invention.

The operation of the digital camera 10 according to the embodiment will be described below. The entire operation of the digital camera 10 in photographing will be briefly described below.

Signals representing an object image output from the CCD 24 by image pickup through the optical unit 22 are sequentially input to the analog signal processing unit 26 and subjected to analog signal processing such as a correlated double sampling process. Thereafter, the resultant signals are input to the ADC 28. The ADC 28 converts R (red), G (green), and B (blue) signals input from the analog signal processing unit 26 into 12-bit R, G, and B signals (digital image data), and outputs the R, G, and B signals to the digital signal processing unit 30.

The digital signal processing unit 30 accumulates digital image data sequentially input from the ADC 28 into a line buffer built in the digital signal processing unit 30 and temporarily stores (memories) in a predetermined area of the RAM 74.

The digital image data stored in the predetermined area of the RAM 74 are read from the digital signal processing unit 30 under the control of the CPU 50. These digital image data are subjected to a digital gain depending on a predetermined physical quantity to perform white balance adjustment. A gamma process and a sharpness process are performed to the digital image data to generate 8-bit digital image data. Furthermore, YC signal processing is performed to the resultant digital image data to generate a luminance signal Y and chroma signals Cr and Cb (to be referred to as YC signals hereinafter). The YC signals are stored in an area different from the predetermined area of the RAM 74.

The LCD 44 is designed to be used as a viewfinder and to display a video (through images) obtained by serial image pickup operations performed by the CCD 24. However, when the LCD 44 is used as a viewfinder as described above, generated YC signals are sequentially output to the LCD 44 through the LCD interface 42. In this manner, the through images are displayed on the LCD 44.

At this time, when the release button 92 is half depressed by the user, after the AE function operates to set an exposure state as described above, the AF function operates to control a focusing operation. Thereafter, when the release button 92 is fully depressed, the YC signals stored in the RAM 74 at this time are compressed in a predetermined compression format (JPEG format in the embodiment) by the compression/expansion process circuit 86 and then recorded on the memory card 82 through the external memory interface 80, thereby performing a photographing operation.

The CPU 50 forcibly causes the light-emitting tube 64 to perform main emission when a forcible light-emitting mode is set by the forcible light-emitting mode 99 in photographing. Even though the forcible light-emitting mode is not set, when a photometric level of an object represented by image information obtained through the CCD 24 is lower than a predetermined level, the CPU 50 causes the light-emitting tube 64 to perform main emission.

When an amount of electric charge obtained by charges in the main capacitor 66 is not sufficient for the main emission of the light-emitting tube 64, the CPU 50 controls the related components such that the main capacitor 66 is electrically charged in parallel to the display operation of the through images on the LCD 44. When the CPU 50 causes the light-emitting tube 64 to perform main emission in photographing, the CPU 50 controls the timing generator 52 such that the preliminary emission signal YS for causing the light-emitting tube 64 to perform preliminary emission for red-eye reduction a plurality of times (in this case, three times) is generated to output the preliminary emission signal YS to the trigger circuit 60 immediately before the main emission. The trigger circuit 60 according to the embodiment is designed such that the light-emitting tube 64 is caused to emit light in a period in which the preliminary emission signal YS is set at an active level (in the embodiment, a high level).

In the digital camera 10, as a timing at which the preliminary emission is performed, a timing which is synchronized with the vertical sync signal VD uniformly used in an image pickup system including the optical unit 22, the CCD 24, the analog signal processing unit 26, the ADC 28, the digital signal processing unit 30, and the motor drive unit 34 is applied. In the digital camera 10, as the timing at which the main emission is performed, a timing synchronized with the vertical sync signal VD is also applied.

The control of preliminary emission of the digital camera 10 according to the embodiment will be described below in detail with reference to FIG. 3. FIG. 3 is a timing chart showing the states of various signals generated by the timing generator 52 when preliminary emission is performed when the power switch 94 of the digital camera 10 is turned on. A case in which an amount of electric charge obtained by charges in the main capacitor 66 is sufficient for preliminary emission and main emission will be described below.

As shown in FIG. 3, the timing generator 52 generates a vertical sync signal VD and a horizontal sync signal HD of the image pickup system in a predetermined cycle when the power switch 94 is in an ON state to output the vertical sync signal VD and the horizontal sync signal HD to the CCD 24. In the CCD 24, the timing generator 52 outputs an analog image signal of one frame (one image) every cycle of the vertical sync signal VD.

On the other hand, the timing generator 52 generates a transfer gate signal TG serving as a signal for transferring signal charges from the light-emitting device arranged in the CCD 24 to a vertical transfer path and an overflow drain signal OFD representing a timing at which excess charges are drained by the overflow drain arranged in the CCD 24 in synchronization with the vertical sync signal VD to output the transfer gate signal TG and the overflow drain signal OFD to the CCD 24.

In this case, in one cycle of the vertical sync signal VD, a period T1 from when the transfer gate signal TG is set at an active level (in the embodiment, a high level) is ended to when a period in which the overflow drain signal OFD is set at an active level (in the embodiment, high level) is ended is almost equal to an operation period of the electronic shutter of the CCD 24. The timing generator 52 according to the embodiment generates a preliminary emission signal YS which can cause the light-emitting tube 64 to perform preliminary emission at some timing in the period T1. In this manner, preliminary emission can be prevented from being performed in an image pickup period T2 except for the operation period of the electronic shutter. As a result, through images can be smoothly displayed without an uncomfortable feeling.

The timing generator 52 generates the preliminary emission signal YS to cause the light-emitting tube 64 to perform preliminary emission a plurality of times (in the embodiment, three times), and then generates a main emission signal to cause the light-emitting tube 64 to perform main emission, thereby performing main emission. At the same time, the CPU 50 controls the related components to perform photographing.

As described above, in the digital camera 10 according to the embodiment, preliminary emission for red-eye reduction is performed an a period of operation of the electronic shutter arranged in the CCD 24 for image pickup. For this reason, even though preliminary emission for red-eye reduction is performed in photographing of a video, a video (through images) can be smoothly displayed.

In the digital camera 10 according to the embodiment, since the preliminary emission signal YS is generated by the timing generator 52, a load of processing on the CPU 50 can be suppressed from being increased in comparison with a case in which a preliminary emission signal is generated by the CPU 50.

In addition, in the digital camera 10 according to the embodiment, since the preliminary emission signal is generated by the timing generator 52, the number of components can be reduced in comparison with a case in which a component for generating a preliminary emission signal is additionally arranged.

In the embodiment, a case in which some timing in a period of operation of the electronic shutter is set as a timing at which the preliminary emission signal YS is set at an active level has been described. However, this timing, as shown in FIG. 4A as an example, is preferably selected from timings in a period corresponding to a cycle between the edge of a pulse of the transfer gate signal TG and the edge of a pulse of the overflow drain signal OFD. More specifically, since both the transfer gate signal TG and the overflow drain signal OFD are originally generated by the timing generator 52, the preliminary emission signal YS can be easily generated by using these signals. Therefore, control for preliminary emission can be easily performed.

In the embodiment, a pulse width of the preliminary emission signal YS is not mentioned. However, as shown in FIG. 4B as an example, another embodiment in which the pulse width of the preliminary emission signal YS can be adjusted by the timing generator 52 controls an amount of light emission of preliminary emission. In this manner, for example, when control is performed such that an amount of light emission of preliminary emission is decreased as an object becomes dark, so that a power consumption for the preliminary emission can be suppressed.

In the embodiment, a case in which the preliminary emission signal YS is generated by the timing generator 52 has been described. However, the invention is not limited to the case. The preliminary emission signal YS can also be generated by a process of software performed by the CPU 50. In this case, although a load of processing on the CPU 50 increases in comparison with the embodiment, the configuration of the timing generator 52 can be simplified.

In the embodiment, a case in which the invention is applied to prevent a display screen of through images from flickering has been described. However, the invention is not limited to the case. When the digital camera 10 is designed to photograph not only a still image but also a video, the invention can also be applied to prevent a display screen from flickering in reproduction of image data obtained by photographing of the video as a matter of course.

Furthermore, the timing charts (FIG. 3 and FIGS. 4A and 4B) which are referred to in the embodiment are only examples. As a matter of course, the timing charts can be appropriately changed without departing from the spirit and scope of the invention.

What is claimed is:

1. An electronic flash device which is used in a camera for performing photographing by an image pickup operation performed by a charge coupled device having an electronic shutter, an overflow drain and a light-receiving device, and which irradiates auxiliary light on an object if necessary in photographing by the camera, the camera having a timing generator for generating timing signals, comprising:
   a light-emitting unit for emitting light to be irradiated on an object; and
   an emission control unit for controlling the light-emitting unit such that preliminary emission for red-eye reduction for constricting pupils of a person is performed in a period of operation of the electronic shutter, wherein
   the timing generator generates a charge transfer signal, an overflow drain signal and a vertical sync signal,
   the charge transfer signal and the overflow drain signal are generated by the timing generator in synchronization with the vertical sync signal,
   the emission control unit controls the light-emitting unit in synchronization with the charge transfer signal, and the overflow drain signal,
   the change transfer signal is used for transferring signal charges from the light-receiving device to a vertical transfer path, and the overflow drain signal controls draining of excess charges by the overflow drain.

2. The electronic flash device according to claim 1, wherein the charge coupled device includes an interline charge coupled device (CCD).

3. The electronic flash device according to claim 1, wherein the charge coupled device includes a frame transfer charge coupled device.

4. A camera comprising:
an electronic flash device, said electronic flash device including a light-emitting unit for emitting light to be irradiated on an object and an emission control unit for controlling the light-emitting unit such that preliminary emission for red-eye reduction for constricting pupils of a person is performed in a period of operation of the electronic shutter;
a charge coupled device for image pickup having an electronic shutter, an overflow drain and a light-receiving device; and
a signal generating unit for generating a drive signal for driving at least the charge coupled device, wherein
the signal generating unit generates a charge transfer signal, an overflow drain signal and a vertical sync signal,
the charge transfer signal and the overflow drain signal are generated by the signal generating unit in synchronization with the vertical sync signal,
the emission control unit of the electronic flash device is included in the signal generating unit and controls the light-emitting unit in synchronization with the charge transfer signal and the overflow drain signal,
the change transfer signal is used for transferring signal charges from the light-receiving device to a vertical transfer path, and
the overflow drain signal controls draining of excess charges by the overflow drain.

5. The camera according to claim 4, wherein the charge coupled device includes an interline charge coupled device.

6. The camera according to claim 4, wherein the charge coupled device includes a frame transfer charge coupled device.

7. The camera according to claim 4, wherein the drive signal includes a charge transfer signal used for driving the charge coupled device.

8. A camera connectable to an electronic flash device that includes a light-emitting unit for emitting light to be irradiated on an object, the camera comprising:
a charge coupled device for image pickup having an electronic shutter, an overflow drain and a light-receiving device;
an emission control unit for controlling the light-emitting unit of connected electronic flash such that preliminary emission for red-eye reduction for constricting pupils of a person is performed in a period of operation of the electronic shutter; and
a signal generating unit for generating a drive signal for driving at least the charge coupled device, wherein
the signal generating unit generates a charge transfer signal, an overflow drain signal and a vertical sync signal,
the charge transfer signal and the overflow drain signal are generated by the signal generating unit in synchronization with the vertical sync signal,
the emission control unit of the electronic flash device is included in the signal generating unit and controls the light-emitting unit in synchronization with the charge transfer signal and the overflow drain signal,
the change transfer signal is used for transferring signal charges from the light-receiving device to a vertical transfer path, and
the overflow drain signal controls draining of excess charges by the overflow drain.

9. A method of controlling a light-emitting unit of an electronic flash which is used with a camera for performing photographing by an image pickup operation performed by a charge coupled device having an electronic shutter, an overflow drain and a light-receiving device, and which irradiates auxiliary light on an object if necessary in photographing by the camera, the camera having a timing generator for generating timing signals, the method comprising:
controlling the light-emitting unit such that preliminary emission for red-eye reduction for constricting pupils of a person is performed in a period of operation of the electronic shutter, said controlling includes controlling the light-emitting unit in synchronization with a charge transfer signal and an overflow drain signal, wherein
the timing generator generates the charge transfer signal, the overflow drain signal and a vertical sync signal,
the charge transfer signal and the overflow drain signal are generated by the timing generator in synchronization with the vertical sync signal,
the change transfer signal is used for transferring signal charges from the light-receiving device to a vertical transfer path, and
the overflow drain signal controls draining of excess charges by the overflow drain.

* * * * *